United States Patent
Gau et al.

(10) Patent No.: US 12,449,362 B2
(45) Date of Patent: Oct. 21, 2025

(54) APPARATUS AND METHOD FOR EXTENDED DEPTH OF FIELD

(71) Applicant: Illumina, Inc., San Diego, CA (US)

(72) Inventors: Jeffrey Gau, San Mateo, CA (US); Joseph Pinto, Solana Beach, CA (US); Anindita Dutta, San Francisco, CA (US); Geraint Evans, Cambridge (GB); Yina Wang, San Jose, CA (US); Simon Prince, Carlsbad, CA (US); Stanley Hong, Palo Alto, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 18/879,735

(22) PCT Filed: Mar. 14, 2024

(86) PCT No.: PCT/US2024/019870
§ 371 (c)(1),
(2) Date: Dec. 27, 2024

(87) PCT Pub. No.: WO2024/196690
PCT Pub. Date: Sep. 26, 2024

(65) Prior Publication Data
US 2025/0164398 A1    May 22, 2025

Related U.S. Application Data

(60) Provisional application No. 63/452,835, filed on Mar. 17, 2023.

(51) Int. Cl.
G01N 21/64    (2006.01)
C12Q 1/6869   (2018.01)

(52) U.S. Cl.
CPC ....... G01N 21/6428 (2013.01); C12Q 1/6869 (2013.01); G01N 21/6458 (2013.01);
(Continued)

(58) Field of Classification Search
CPC ........... G01N 21/6428; G01N 21/6458; G01N 2021/6439; G01N 2021/6441; C12Q 1/6869
See application file for complete search history.

(56) References Cited

U.S. PATENT DOCUMENTS

RE48,561  E      5/2021  Feng et al.
2007/0236769 A1* 10/2007 Zalevsky ........... G02B 27/0075
                                          359/238
(Continued)

OTHER PUBLICATIONS

Jin, L. et al., Deep-learning extended depth-of-field microscope for fast and slide-free histology. Proc Natl Acad Sci USA 117, 3305133060 (2020).
(Continued)

Primary Examiner — Dominic J Bologna
(74) Attorney, Agent, or Firm — FROST BROWN TODD LLP

(57) ABSTRACT

A method for extending a depth of field of a nucleic acid sequencer may comprise optimization steps which are repeated one or more times, in which a result of passing light through an objective lens and a mask is compared with an ideal result, and any discrepancy is used to update the mask. Such a mask may be incorporated into a nucleic acid sequencer which adds fluorescent tags to nucleic acid sites and then detect light emitted from the fluorescent tags, thereby extending the sequencer's depth of field.

12 Claims, 11 Drawing Sheets

(52) U.S. Cl.
CPC ............... *G01N 2021/6439* (2013.01); *G01N 2021/6441* (2013.01)

(56) References Cited

U.S. PATENT DOCUMENTS

| | | | |
|---|---|---|---|
| 2012/0257197 A1* | 10/2012 | Feldkhun | G01N 21/4795 356/450 |
| 2012/0281280 A1* | 11/2012 | Buehler | G02F 1/13363 977/932 |
| 2017/0146706 A1 | 5/2017 | Elmalem et al. | |
| 2018/0260940 A1* | 9/2018 | Langlois | G06T 5/80 |
| 2019/0056581 A1 | 2/2019 | Tomer et al. | |
| 2019/0087948 A1 | 3/2019 | Langlois et al. | |
| 2021/0222239 A1* | 7/2021 | Chen | G01N 21/6486 |
| 2022/0267842 A1 | 8/2022 | Chen et al. | |

OTHER PUBLICATIONS

Liao, Meihua, et al. "Extending the depth-of-field of imaging systems with a scattering diffuser." *Scientific reports* 9.1 (2019): 7165.

Liu, Sheng, and Hong Hua. "Extended depth-of-field microscopic imaging with a variable focus microscope objective." *Optics express* 19.1 (2010): 353-362.

Matsumoto, Naoya, et al. "Amplitude-modulation-type multi-ring mask for two-photon excitation scanning microscopy." *OSA Continuum* 4.6 (2021): 1696-1711.

Nehme, E. et al. Learning Optimal Wavefront Shaping for Multi-Channel Imaging, IEEE Trans. Pattern Anal. Mach. Intell. 43, 21792192 (2021).

Ronneberger, Olaf, Philipp Fischer, and Thomas Brox. "U-net: Convolutional networks for biomedical image segmentation." *Medical image computing and computer-assisted intervention—MICCAI 2015: 18th international conference*, Munich, Germany, Oct. 5-9, 2015, *proceedings, part III 18*. Springer International Publishing, 2015.

Schneider, Magdalena C., et al. "Interactive simulation and visualization of point spread functions in single molecule imaging." *Optics Communications* 560 (2024): 130463.

Shuang, Bo, et al. "Generalized recovery algorithm for 3D super-resolution microscopy using rotating point spread functions." *Scientific reports* 6.1 (2016): 30826.

Zhao, Tingyu, Thomas Mauger, and Guoqiang Li. "Optimization of wavefront-coded infinity-corrected microscope systems with extended depth of field." *Biomedical optics express* 4.8 (2013): 1464-1471.

International Search Report and Written Opinion dated Aug. 7, 2024, for International Application No. PCT/US2024/019870, 13 pages.

* cited by examiner

APPARATUS AND METHOD FOR EXTENDED DEPTH OF FIELD

This application is a national entry under 35 U.S.C. § 371 of international application PCT/US2024/019870, filed Mar. 14, 2024 for "Apparatus and Method for Extended Depth of Field," which itself claims the benefit of and priority to U.S. provisional patent application Ser. No. 63/452,835, filed Mar. 17, 2023 for "Apparatus and Method for Extended Depth of Field," the disclosures of which are hereby incorporated herein by reference in their entirety.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

A primary driver of optical signal to noise ratio is a point spread function (PSF), and the PSF will degrade as defocus on an object being image decreases. Thus, technology for improving focus during sequencing may decrease noise, and thereby allow for increased accuracy in base calling, lower cost through higher numerical aperture objectives, and increased throughput through larger field of view. Accordingly, there is a need for improvements in technology for improving focus, such as through extending the depth of field of imaging components used in sequencers.

SUMMARY

Examples disclosed herein are directed to techniques for extending the depth of field of sequencers.

An implementation relates to a nucleic acid sequencer comprising: a flow delivery module configured to add fluorescent tags to nucleic acid sites by flowing reagents through a flow cell comprising the nucleic acid sites, and a detection system configured to detect the fluorescent tags, the detection system comprising an objective lens, a set of detection pixels, and a mask disposed between the objective lens and the set of detection pixels.

In some implementations such as described in the second paragraph of this summary, the mask is a phase mask.

In some implementations such as described in the second paragraph of this summary, the mask is an amplitude mask.

In some implementations such as described in any of the second through fourth paragraphs of this summary, the detection system has a numerical aperture of about 1.1 or greater, and depth of field of greater than +/−300 nm.

In some implementations such as described in an of the second through fourth paragraphs of this summary, the depth of field of the detection system is greater than or equal to 1000 nm.

In some implementations such as described in any of the second through sixth paragraphs of this summary, the mask is a deformable mirror or a spatial light modulator.

In some implementations such as described in any of the second through seventh paragraphs of this summary, the mask comprises two or more materials, wherein each material of the two or more materials is a glass having a difference in dispersion greater than about 5% from the dispersion of every other material from the two or more materials.

In some implementations such as described in any of the second through ninth paragraphs of this summary, the objective lens is comprised by an objective lens assembly within the detection system, and the mask is disposed between the objective lens and a tube lens within the objective lens assembly.

Another implementation relates to a method for extending a depth of field of a nucleic acid sequencer, the method comprising: performing a set of optimization steps comprising: determining a first result, wherein the first result is a result of passing light emitted by a sample at a nucleic acid site through an objective lens and a mask, wherein the objective lens is focused on a plane which is separated from the nucleic acid site by a target defocus amount, and wherein the mask is disposed between the objective lens and a set of detection pixels; determining whether there is a discrepancy between the first result and a second result, wherein the second result is an ideal result for detecting light emitted by the sample at the nucleic acid site; and based on determining there is the discrepancy between the first result and the second result, performing a set of updating tasks comprising updating the mask based on the determined discrepancy between the first result and the second result; and repeating the set of optimization steps one or more times.

In some implementations such as described in the tenth paragraph of this summary, the first result is a first point spread function (PSF) indicating how light emitted by the sample at the nucleic acid site is detected by the set of detection pixels after passing through the objective lens and the mask when the objective lens is out of focus by a target defocus amount; and the second result is a second PSF indicating how light emitted by the sample at the nucleic acid site is detected by the set of detection pixels when the sample at the nucleic acid site is focused on a surface of the sample.

In some implementations such as described in the eleventh paragraph of this summary, the nucleic acid sequencer is configured to detect light signals emitted from multiple surfaces of a multi-surface flowcell; updating the mask based on the determined discrepancy comprises applying a loss function, wherein the piecewise loss function comprises' a first loss component configured to ensure that signals from a first surface of the multi-surface flowcell are in focus; and a second loss component configured to ensure that signals from a second surface of the multi-surface flowcell are out of focus.

In some implementations such as described in the tenth paragraph of this summary, the mask is an amplitude mask, the sample at the nucleic acid site comprises a plurality of clusters, the set of optimization steps comprises: separating the plurality of clusters into a first set of clusters and a second set of clusters, and updating the mask based on the determined discrepancy comprises determining a loss based on a mean and a standard deviation of the first set of clusters, and a mean and a standard deviation of the second set of dusters.

In some implementations such as described in the tenth paragraph of this summary, the first result is a sequence of base calls generated by a base calling algorithm based on light emitted from the sample at the nucleic acid site and detected by the set of detection pixels after passing through objective lens and the mask; and the second result is a sequence of base calls for a reference genome.

In some implementations such as described in the fourteenth paragraph of this summary, the base calling algorithm comprises a machine learning model; and the set of updating tasks comprises updating the machine learning model based on the discrepancy between the first result and the second result.

In some implementations such as described in the tenth paragraph of this summary, the nucleic acid sequencer is configured to detect light signals in a plurality of wavelengths; the first result is a result of passing a first wavelength of light emitted by the sample at the nucleic acid site through the objective lens and the mask; and the set of optimization steps comprises: determining a third result, wherein the third result is a result of passing a second wavelength of light emitted by the sample at the nucleic acid site through the objective lens and a second mask, wherein the objective lens is focused on the plane which is separated from the nucleic acid site by the target defocus amount, and wherein the second mask is disposed between the objective lens and a second set of detection pixels, determining whether there is a discrepancy between the second result with and the third result; and based on determining there is a discrepancy between the second result and the third result, performing a second set of updating tasks comprising updating the second mask based on the determined discrepancy between the second result and the third result.

In some implementations such as described in the tenth paragraph of this summary, the mask is a phase mask.

In some implementations such as described in the tenth paragraph of this summary, on each repetition of the set of optimization steps: determining the first result is performed a plurality of times, wherein each time from the plurality of times, the target defocus amount is different from the target defocus amount on each other time from the plurality of times; performing the set of updating tasks is performed a set of times, wherein each time the set of updating tasks is performed, a loss is calculated which corresponds to the target defocus amount from a different time from the plurality of times.

In some implementations such as described in the eighteenth paragraph of this summary, on each repetition of the set of optimization steps, the plurality of times the first result is determined has a cardinality less than the set of times the set of updating tasks is performed.

In some implementations such as described in the nineteenth paragraph of this summary, on each repetition of the set of optimization tasks: the set of updating tasks comprises determining the target defocus resulting in the largest discrepancies between the first result and the second result, and each loss which is calculated during performance of the set of updating tasks corresponds to a target defocus amount which results in a greater discrepancy between the first result and the second result than any target defocus amount which does not correspond to a loss calculated during that repetition of the set of optimization tasks.

In some implementations such as described in any of the tenth through twentieth paragraphs of this summary, the set of optimization steps are performed in simulation.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any protection provided by this document or any related document, which scope is defined by the respective document's claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various examples, is described in detail with reference to the following figures. The figures are provided for purposes of illustration only and merely depict typical or example implementations.

The figures are not exhaustive and do not limit the present disclosure to the precise form disclosed.

DETAILED DESCRIPTION

As used herein to refer to a sample, the term "spot" or "feature" is intended to mean a point or area in a pattern that may be distinguished from other points or areas according to relative location. An individual spot may include one or more molecules of a particular type. For example, a spot may include a single target nucleic acid molecule having a particular sequence or a spot may include several nucleic acid molecules having the same sequence (and/or complementary sequence, thereof).

As used herein to refer to a spot or feature in connection with a direction, the term "pitch" is intended to mean the separation of the spot or feature front other spots or features in the direction. For example, if a sample container has an array of features which are separated from each other by 650 nm in the direction that the container would be moved during imaging, then the "pitch" of the features in that direction may be referred to as being 650 nm.

As used herein, the term "xy plane" is intended to mean a 2 dimensional area defined by straight line axes x and y in a Cartesian coordinate system. When used in reference to a detector and an object observed by the detector, the area may be further specified as being orthogonal to the direction of observation between the detector and object being detected. When used herein to refer to a line scanner, the term "y direction" refers to the direction of scanning.

As used herein, the term "z coordinate" is intended to mean information that specifies the location of a point, line or area along an axes that is orthogonal to an xy plane. In particular implementations, the z axis is orthogonal to an area of an object that is observed by a detector. For example, the direction of focus for an optical system may be specified along the z axis.

As used herein, the term "scan a line" is intended to mean detecting a 2-dimensional cross-section in an xy plane of an object, the cross-section being rectangular or oblong, and causing relative movement between the cross-section and the object. For example, in the case of fluorescence imaging an area of an object having rectangular or oblong shape may be specifically excited (at the exclusion of other areas) and/or emission from the area may be specifically acquired (at the exclusion of other areas at a given time point in the scan.

Figure 1:
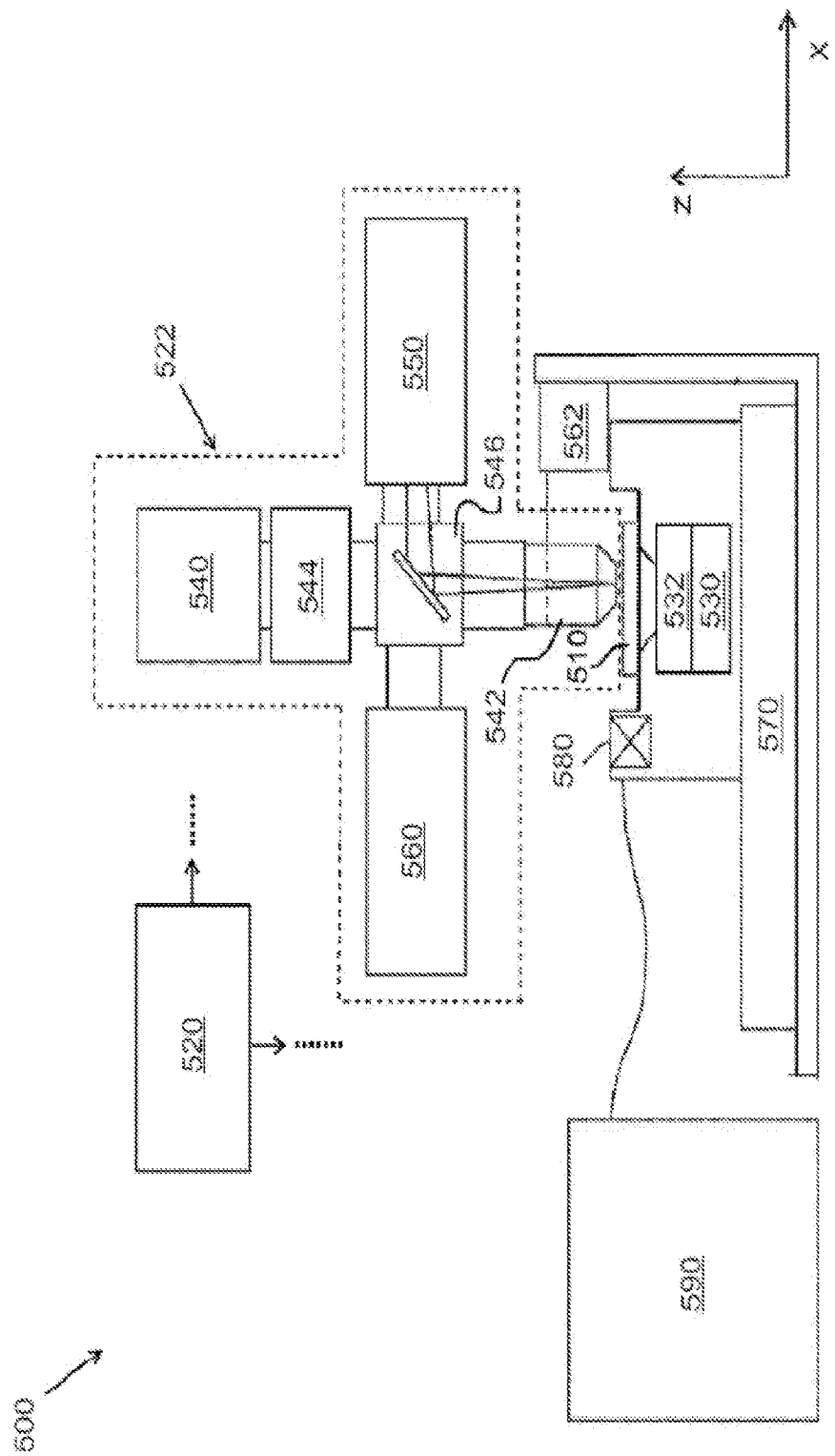
FIG. 1 depicts a schematic view of another example of a system that may be used to provide biological or chemical analysis.

Discussed herein is technology which may improve focus during sequencing by extending the depth of field in which a sample can be imaged. FIG. 1 illustrates a schematic diagram of another example of a system 500 that may be used to perform an analysis on one or more samples of interest. System 500 is configured to perform a large number of parallel reactions within a flow cell 510. Flow cell 510 may thus include one or more flow channels that receive a solution from system 500 and direct the solution toward reaction sites of flow cell 510.

System 500 includes a system controller 520 that may communicate with the various components, assemblies, and sub-systems of the system 500. An imaging assembly 522 of system 500 includes a light emitting assembly 550 that emits light that reaches reaction sites on flow cell 510. Light emitting assembly 550 may include an incoherent light emitter (e.g., emit light beams output by one or more excitation diodes), or a coherent light emitter such as emitter of light output by one or more lasers or laser diodes. In some implementations, light emitting assembly 550 may include a plurality of different light sources (not shown), each light source emitting light of a different wavelength range. Some versions of light emitting assembly 550 may also include one or more collimating lenses (not shown), a light structuring optical assembly (not shown), a projection lens (not shown) that is operable to adjust a structured beam shape and path, epifluorescence microscopy components, and/or other components. Although system 500 is illustrated as having a single light emitting assembly 550, multiple light emitting assemblies 550 may be included in some other implementations.

In the present example, the light from light emitting assembly 550 is directed by dichroic mirror assembly 546 through an objective lens assembly 542 onto a sample of a flow cell 510, which is positioned on a motion stage 570. In the case of fluorescent microscopy of a sample, a fluorescent element associated with the sample of interest fluoresces in response to the excitation light, and the resultant light is collected by objective lens assembly 542 and is directed to an image sensor of camera system 540 to detect the emitted fluorescence. In some implementations, a tube lens assembly may be positioned between the objective lens assembly 542 and the dichroic mirror assembly 546 or between the dichroic mirror 546 and the image sensor of the camera system 540. A moveable lens element may be translatable along a longitudinal axis of the tube lens assembly to account for focusing on an upper interior surface or lower interior surface of the flow cell 510 and/or spherical aberration introduced by movement of the objective lens assembly 542.

In the present example, a filter switching assembly 544 is interposed between dichroic mirror assembly 546 and camera system 540. Filter switching assembly 544 includes one or more emission filters that may be used to pass through particular ranges of emission wavelengths and block (or reflect) other ranges of emission wavelengths. For example, emission filters may be used to direct different wavelength ranges of emitted light to different image sensors of the camera system 540 of imaging assembly 522. For instance, the emission filters may be implemented as dichroic mirrors that direct emission light of different wavelengths from flow cell 510 to different image sensors of camera system 540. In some variations, a projection lens is interposed between filter switching assembly 544 and camera system 540. Filter switching assembly 544 may be omitted in some versions.

System 500 further includes a fluid delivery assembly 590 that may direct the flow of reagents (e.g., fluorescently labeled nucleotides, buffers, enzymes, cleavage reagents, etc.) to (and through) flow cell 510 and waste valve 550. System 500 of the present example also includes a temperature station actuator 530 and heater/cooler 532 that may optionally regulate the temperature of conditions of the fluids within the flow cell 510. In some implementations, the heater/cooler 532 may be fixed to sample stage 570, upon which the flow cell 510 is placed, and/or may be integrated into sample stage 570.

Flow cell 510 may be removably mounted on sample stage 570, which may provide movement and alignment of flow cell 510 relative to objective lens assembly 542. Sample stage 570 may have one or more actuators to allow sample stage 570 to move in any of three dimensions. For example, actuators may be provided to allow sample stage 570 to move in the x, y, and z directions relative to objective lens assembly 542, tilt relative to objective lens assembly 542, and/or otherwise move relative to objective lens assembly 542. Movement of sample stage 570 may allow one or more sample locations on flow cell 516 to be positioned in optical alignment with objective lens assembly 542. Movement of sample stage 570 relative to objective lens assembly 542 may be achieved by moving sample stage 570 itself, by moving objective lens assembly 542, by moving some other component of imaging assembly 522, by moving some other component of system 500, or any combination of the foregoing. For instance, in some implementations, the sample stage 570 may be actuatable in the x and y directions relative to the objective lens assembly 542 while a focus component 562 or z-stage may move the objective lens assembly 542 along the z direction relative to the sample stage 570.

In some implementations, a focus component 562 may be included to control positioning of one or more elements of objective lens assembly 542 relative to the flow cell 510 in the focus direction (e.g., along the z-axis or z-dimension). Focus component 562 may include one or more actuators physically coupled to the objective lens assembly 542, the optical stage, the sample stage 570, or a combination thereof, to move flow cell 510 on sample stage 570 relative to the objective lens assembly 542 to provide proper focusing for the imaging operation. In the present example, the focus component 562 utilizes a focus tracking module 560 that is configured to detect a displacement of the objective lens assembly 542 relative to a portion of the flow cell 510 and output data indicative of an in-focus position to the focus component 562 or a component thereof or operable to control the focus component 562, such as controller 520, to move the objective lens assembly 542 to position the corresponding portion of the flow cell 510 in focus of the objective lens assembly 542.

In some implementations, an actuator of focus component 562 or for sample stage 570 may be physically coupled to objective lens assembly 542, the optical stage, sample stage 570, or a combination thereof, such as, for example, by mechanical, magnetic, fluidic, or other attachment or contact directly or indirectly to or with the stage or a component thereof. The actuator of focus component 562 may be configured to move objective lens assembly 542 in the z-direction while maintaining sample stage 570 in the same plane (e.g., maintaining a level or horizontal attitude, perpendicular to the optical axis). In some implementations, sample stage 570 includes an x direction actuator and a y direction actuator to form an x-y stage. Sample stage 570 may also be configured to include one or more tip or tilt actuators to tip or tilt sample stage 570 and/or a portion thereof, to account for any slope in its surfaces.

Camera system 540 may include one or more image sensors to monitor and tack the imaging (e.g., sequencing) of flow cell 510. Camera system 540 may be implemented, for example, as a CCD or CMOS image sensor camera, but other image sensor technologies (e.g., active pixel sensor) may be used. By way of further example only, camera system 540 may include a dual-sensor time delay integration (TDI) camera, a single-sensor camera, a camera with one or more two-dimensional image sensors, and/or other kinds of camera technologies. In various embodiments, one or more image sensors may be positioned under flow cell 510, such as within the sample stage 570 or below the sample stage 570; or may even be integrated into flow cell 510.

Figure 11:
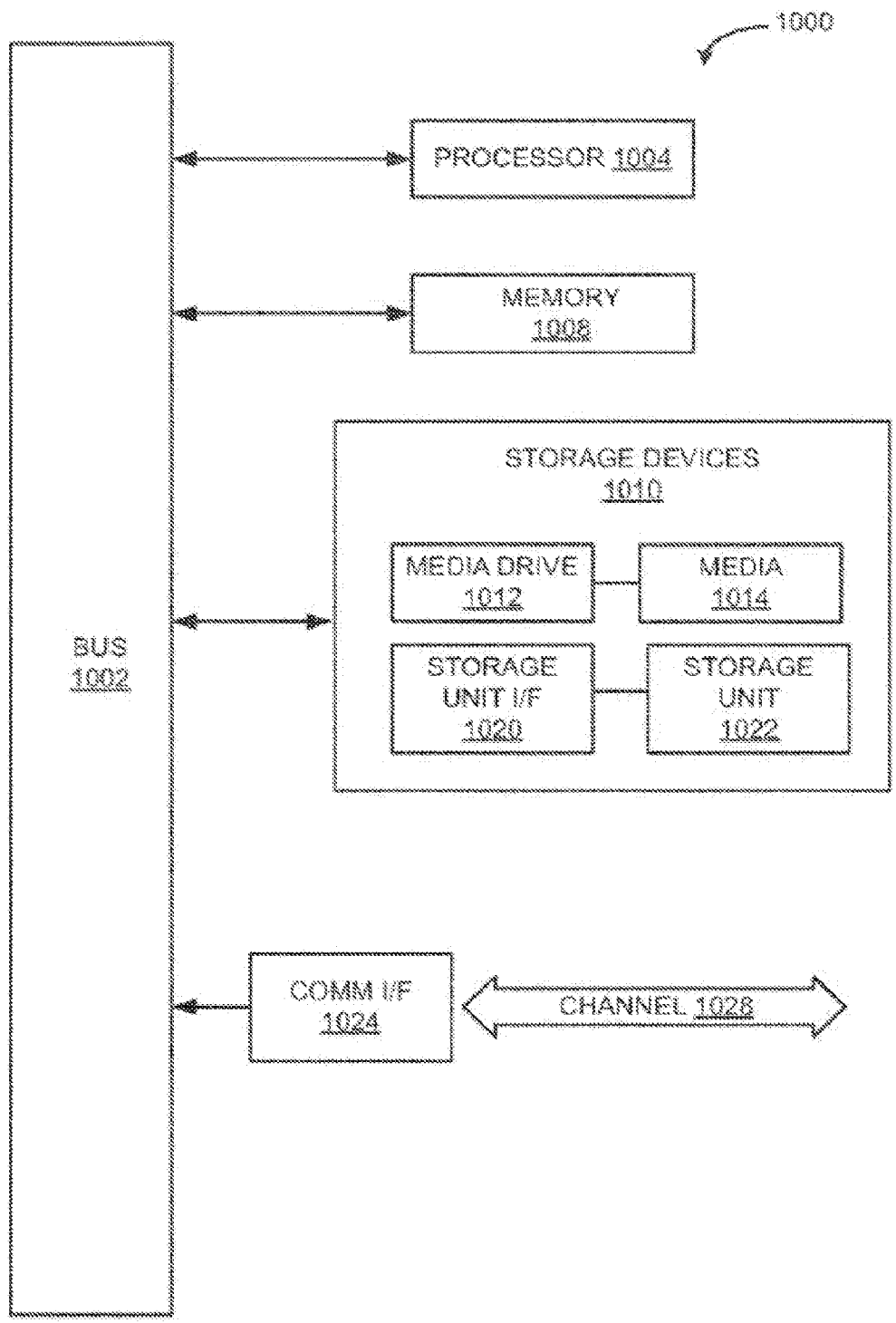
FIG. 11 illustrates an example computing module that may be used to implement various features of implementations described in the present disclosure.

Although not illustrated, a controller, which may be implemented as a computing module such as discussed infra in the context of FIG. 11, may be provided to control the operation of the scanning system. The controller may be implemented to control aspects of system operation such as, for example, focusing, stage movement, and imaging operations. In various implementations, the controller may be implemented using hardware, algorithms (e.g., machine executable instructions), or a combination of the foregoing. For example, in some implementations the controller may include one or more CPUs or processors with associated memory. As another example, the controller may comprise hardware or other circuitry to control the operation, such as a computer processor and a non-transitory computer readable medium with machine-readable instructions stored thereon. For example, this circuitry may include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller may comprise a combination of this circuitry with one or more processors.

Figure 2:
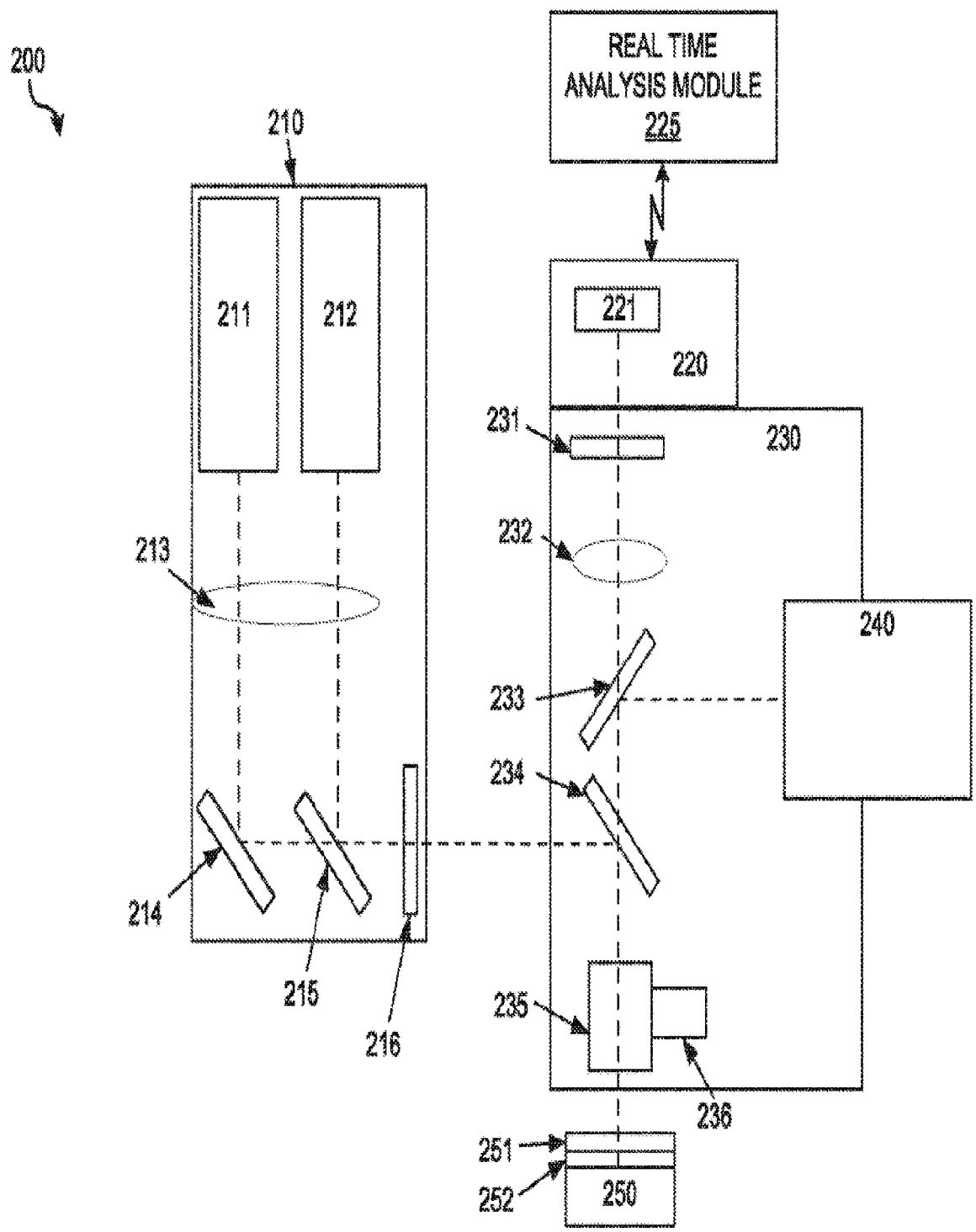
FIG. 2 is block diagram illustrating an example two-channel, line-scanning modular optical imaging system that may be implemented in particular implementations.

Other imaging systems may also be used when implementing the disclosed technology. For example, FIG. 2 is block diagram illustrating an example two-channel, line-scanning modular optical imaging system 200 in which aspects of the disclosed technology may be implemented. In some implementations, system 200 may be used for the sequencing of nucleic acids. Applicable techniques include those where nucleic acids are attached at fixed locations in an array (e.g., the wells of a flow cell) and the array is imaged repeatedly while in motion relative to the field of view of a camera in the imaging system 200. In such implementations, system 200 may obtain images in two different color channels, which may be used to distinguish a particular nucleotide base type from another. More particularly, system 200 may implement a process referred to as "base calling," which generally refers to a process of a determining a base call (e.g., adenine (A), cytosine (C), guanine (G), or thymine (T)) for a given spot location of an image at an imaging cycle. During two-channel base calling, image data extracted from two images may be used to determine the presence of one of four base types by encoding base identity as a combination of the intensities of the two images. For a given spot or location in each of the two images, base identity may be determined based on whether the combination of signal identities is [on, on], [on, off], [off, on], or [off, off].

Referring again to imaging system 200, the system includes a line generation module (LGM) 210 with two light sources, 211 and 212, disposed therein. Light sources 211 and 212 may be coherent light sources such as laser diodes which output laser beams. Light source 211 may emit light in a first wavelength (e.g., a red color wavelength), and light source 212 may emit light in a second wavelength (e.g., a green color wavelength). The light beams output from laser sources 211 and 212 may be directed through a beam shaping lens or lenses 213. In some implementations, a single light shaping lens may be used to shape the light beams output from both light sources. In other implementations, a separate beam shaping lens may be used for each light beam. In some examples, the beam shaping lens is a Powell lens, such that the light beams are shaped into line patterns. The beam shaping lenses of LGM 210 or other optical components imaging system may shape the light emitted by light sources 211 and 212 into a line patterns (e.g., by using one or more Powel lenses, or other beam shaping lenses, diffractive or scattering components).

LGM 210 may further include mirror 214 and semi-reflective mirror 215 to direct the light beams through a single interface port to an emission optics module (EOM) 230. The light beams may pass through a shutter element 216. EOM 230 may include objective 235 and a z-stage 236 which moves objective lens 235 longitudinally closer to or further away from a target 250. For example, target 250 may include a liquid layer 252 and a translucent cover plate 251, and a biological sample may be located at an inside surface of the translucent cover plate as well an inside surface of the substrate layer located below the liquid layer. The z-stage 236 may then move the objective as to focus the light beams onto either inside surface of the flow cell (e.g., focused on the biological sample). Similarly, in some implementations, the target 250 may be mounted on, or include a stage movable in the xy plane relative to the objective lens 235. The biological sample may be DNA, RNA, proteins, or other biological materials responsive to optical sequencing as known in the art.

EOM 230 may include semi-reflective mirror 233 to reflect a focus tracking light beam emitted from a focus tracking module (FTM) 240 onto target 250, and then to reflect light returned from target 250 back into FTM 240. FTM 240 may include a focus tracking optical sensor to detect characteristics of the returned focus tracking light beam and generate a feedback signal to optimize focus of objective 235 on target 250.

EOM 230 may also include semi-reflective mirror 234 to direct light through objective lens 235, while allowing light returned from target 250 to pass through. In some implementations, EOM 230 may include a tube lens 232. Light transmitted through tube lens 232 may pass through filter element 231 and into camera module (CAM) 220. CAM 220 may include one or more optical sensors 221 to detect light emitted from the biological sample in response to the incident light beams (e.g., fluorescence in response to red and green light received from light sources 211 and 212).

Output data from the sensors of CAM 220 may be communicated to a real time analysis module 225. Real time analysis module, in various implementations, executes computer readable instructions for analyzing the image data (e.g., image quality scoring, base calling, etc.), reporting or displaying the characteristics of the beam (e.g., focus, shape, intensity, power, brightness, position) to a graphical user interface (GUI), etc. These operations may be performed in real-time during imaging cycles to minimize downstream analysis time and provide real time feedback and troubleshooting during an imaging run. In implementations, real time analysis module may be a computing device (e.g., computing device 11000) that is communicatively coupled to and controls imaging system 200. In implementations further described below, real time analysis module 225 may additionally execute computer readable instructions for controlling illumination of the target 250 and optionally for integrating data gathered during multiple exposures of the optical sensor(s) 221 into an image.

It is possible that still other types of imaging systems may be used with the disclosed technology. For example, the disclosed technology may be used in line scan systems, but it may also be used in area scan systems, in which a two dimensional pixel array is used to capture light from a sample in a step and shoot style procedure. Accordingly, the illustrations and discussions related to line scan systems should be understood as being illustrative only, and should not be treated as limiting.

Figure 3:
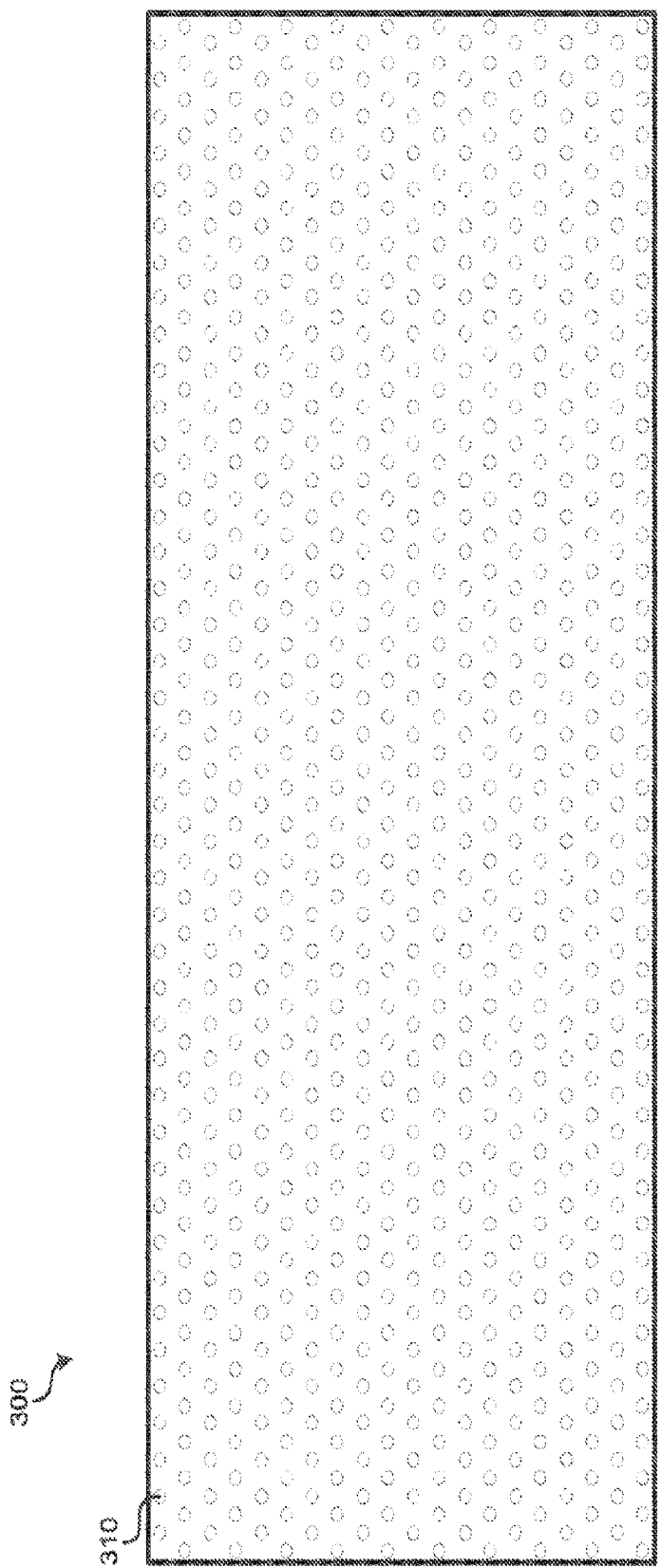
FIG. 3 illustrates an example configuration of a patterned sample that may be imaged in accordance with implementations disclosed herein.

FIG. 3 illustrates an example configuration of a sample container 300 that may be imaged in accordance with implementations disclosed herein. In this example, sample container 300 is patterned with a hexagonal array of ordered spots 310 that may be simultaneously imaged during an imaging run. Although a hexagonal array is illustrated in this example, in other implementations the sample container may be patterned using a rectilinear array, a circular array, an octagonal array, or some other array pattern. For ease of illustration, sample container 300 is illustrated as having tens to hundreds of spots 310. However, as may be appreciated by one having skill in the art, sample container 300 may have thousands, millions, or billions of spots 310 that are imaged. Moreover, in some instances, sample container 300 may be a multi-plane sample comprising multiple planes (perpendicular to focusing direction) of spots 310 that are sampled during an imaging run.

In a particular implementation, sample container 300 may be a flow cell patterned with millions or billions of wells that are divided into lanes. In this particular implementation, each well of the flow cell may contain biological material that is sequenced using sequencing by synthesis.

Figure 4:
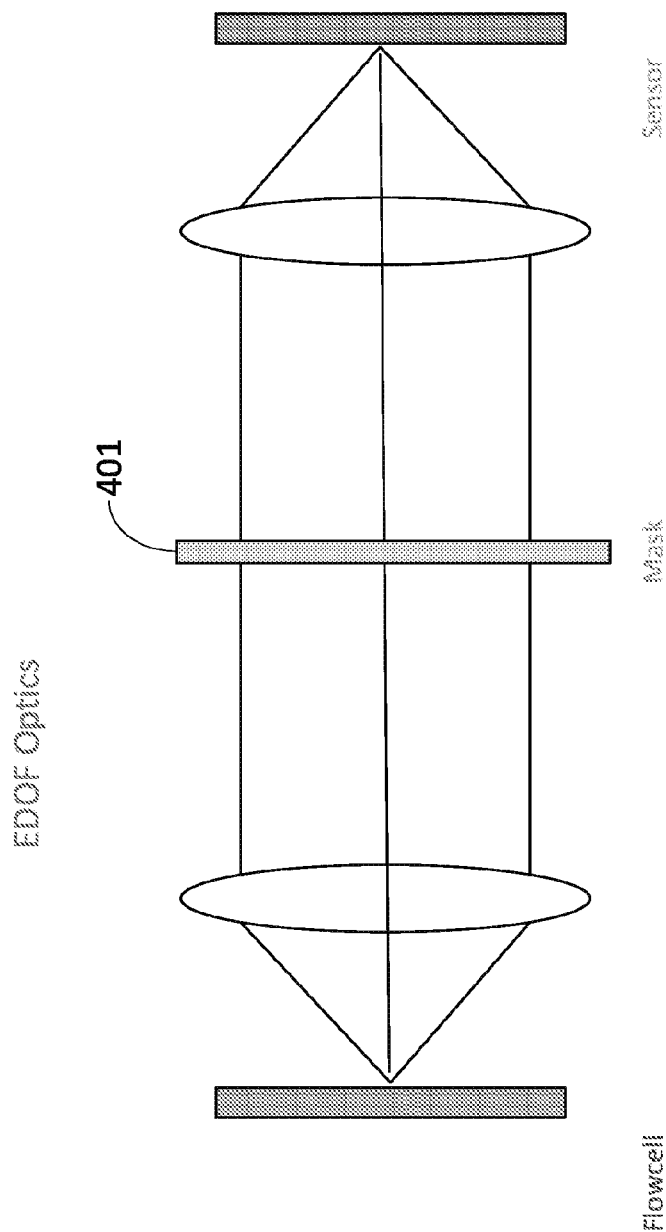
FIG. 4 illustrates an optical configuration for extending usable depth of field.
Figure 5:
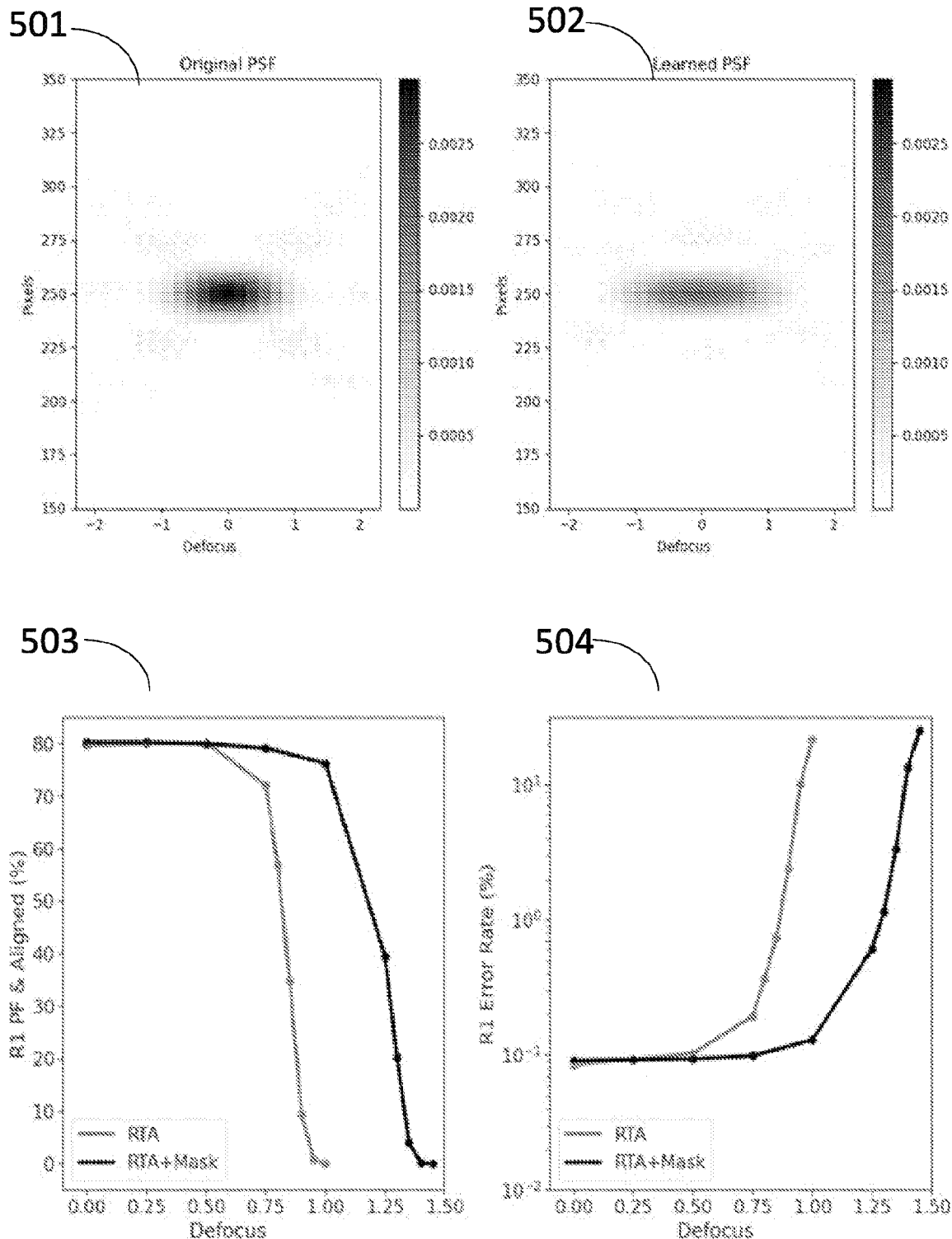
FIG. 5 illustrates impacts of optical masks implemented based on this disclosure.

Turning now to FIG. 4, that figure illustrates a simplified optical configuration for extending usable depth of field in which a mask 401 is disposed at the exit pupil plane between an objective and a sensor, such as within objective lens assembly 542 of FIG. 1, or objective 235 and sensors 221 of FIG. 2. In different variations, such a mask may be disposed at any point on an optical path between the objective lens and the sensor, such as between an objective lens 235 and a tube lens 232 in a configuration such as shown in FIG. 2. In operation, this mask 401 will modify the field at the exit plane which, in turn, will modify the point spread function, and will allow for improved focus throughout a broader depth of field than may otherwise be feasible. FIG. 5 illustrates the impact that such a mask can have, with a first graph 501 showing a point spread function in a sequencer without a mask, and a second graph 502 showing a point spread function in a sequencer which includes a mask. As indicated in those graphs, including a mask can result in a sequencer having a distinguishable point spread function over a larger range of focus values—e.g., +/−1000 nm versus +/−60 nm, as illustrated (or +/−300 nm versus +/−190 nm in a system with a numerical aperture of greater than or equal to about 1.1, such as a system with a numerical aperture of 1.1 precisely, a system with a numerical aperture of 1.2, a system with a numerical aperture of 1.3, etc.). This demonstrates that inclusion of a mask can successfully extend the sequencer's depth of field by providing a dimmer (but still distinguishable) PSF over a larger range. FIG. 5 also provides a third graph 503 and a fourth graph 504 showing that masks such as described herein can reduce the error rate (i.e., the number of mismatches between produced basecalls and the reference genome) and increase the throughput in simulations where all known noise sources were added to PSFs generated using optics with masks and the associated images were then used for sequencing a reference genome.

Figure 6:
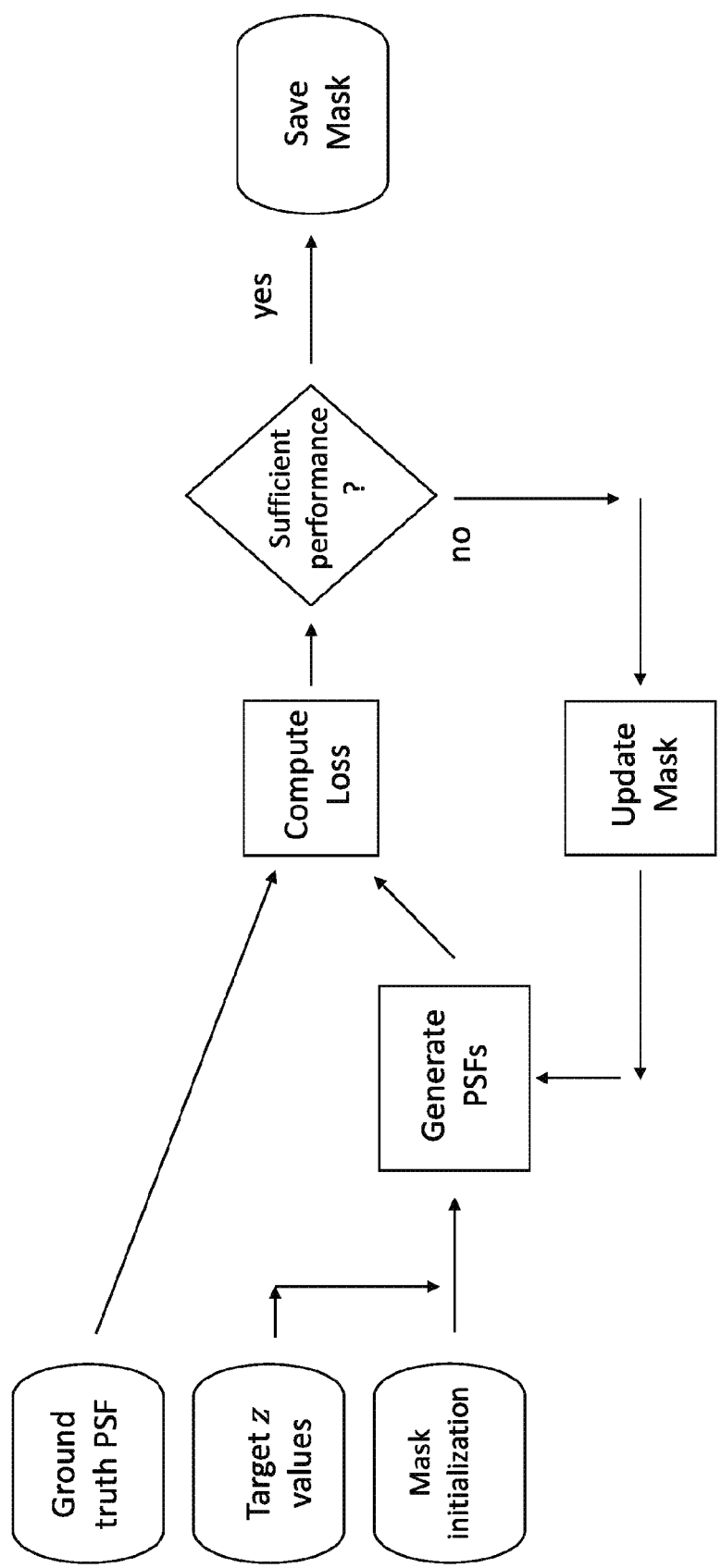
FIG. 6 illustrates a method by which an optical mask may be designed.

Turning now to FIG. 6, that figure illustrates a method by which a mask 401 such as shown in FIG. 4 may be designed. This method, which will preferably be performed in simulation using a computer such as shown in FIG. 11. provides an iterative process in which PSFs generated based on use of a mask will be compared with a ground truth PSF (e.g., a best possible PSF, which would be a PSF with zero defocus and no mask), and the differences between the ground truth PSF and the mask generated PSFs will be used as feedback for improving the mask. In the method of FIG. 6, the mask may be initialized to have random values (e.g., random phase delay values between 0 and $2\pi$ for a phase mask, or random opacity values between 0 and 100% for an amplitude mask) and so the PSFs generated by that mask for the system's target z values (i.e., the defocus amounts which could be expected to be encountered in practice) would be expected to provide little, if any, improvement relatives to the PSFs that would be generated at the target z values without any mask. However, by calculating a loss of the generated PSFs relative to the ground truth PSF (e.g., using a mean squared error loss function), and then using that loss to modify the mask design (e.g., through gradient descent updating), can gradually improve the performance of the mask being designed until some sufficiency condition (e.g., performance ceases to improve, performance improvement across iterations decreases below a threshold speed, a predetermined number of iterations has been reached, etc.) is met. At which point, the final mask design from when the performance condition was satisfied may be manufactured an incorporated into sequencers such as shown in FIG. 1 or 2 to extend their depth of field relative to what would otherwise be available.

Of course, it should be understood that the method of FIG. 6 and associated discussion are intended to be illustrative only, and that variations on the depicted method and associated discussion are both contemplated and could be implemented by those of ordinary skill in the an without undue experimentation in light of this disclosure. To illustrate, consider the loss function which is used to generate the feedback for updating the mask. As described in U.S. reissued patent RE48,561, reissued May 18, 2021, the disclosure of which is hereby incorporated by reference in its entirety, in some cases a sample may be disposed on multiple vertically separated surfaces. In such a case, expanding the depth of field may have a drawback in that a depth of field which is great enough to cover multiple imaging surfaces can result in signals from the multiple surfaces interfering with each other. To address this issue, in some implementations, rather than simply using a loss function such as mean squared error, a loss function may be defined in a piecewise manner, with different portions of the piecewise function corresponding target z values at which signals from different surfaces would be detected. Other modifications to the loss function which may be used in various implementations are also possible. For instance, in a case where the mask is an amplitude mask, the mask may be designed by randomly assigning clusters in a simulated sample as "on" or "off," and then using a function such as equation 1 below (in which $I_{on}$ and $I_{off}$ are the mean intensities of on and off clusters, respectively, $\alpha$ is a weighting coefficient, and $\sigma_{on}$ and $\sigma_{off}$ are, the standard deviation of on and off clusters, respectively) as the loss function in a process such as shown in FIG. 6.

$$L = -\log(I_{on} - I_{off}) + \alpha(\sigma_{on} + \sigma_{off}) \qquad \text{Equation 1}$$

Variations are also possible in aspects of a process such as shown in FIG. 6 other than the loss function as discussed above. For example, because different wavelengths of light will generally have different PSFs, mask design may be performed in a way that accounts for the particular wavelengths which will be used in the sequencer where such a mask will be used. This may be done, for example, by training wavelength specific masks (e.g., phase masks), rather than by designing a single mask that would be used for all wavelengths. Subsequently, these multiple masks could be placed at or close to the Fourier plane (e.g., immediately behind the objective) before the camera of the sequencer of each channel of the detection path. When designing these multiple masks, a median wavelength may be chosen to represent each wavelength which would be read in practice, and masks may be simultaneously designed using each of those median wavelengths. As another variation which may be implemented in some cases to address issues raised by the use of multiple wavelengths, in some cases the dimensions of pixels which would detect different wavelengths may be held constant by changing either the dimensions of the pixels in the image plane, or the number of pixels in the image and pupil planes to allow joint optimization of masks across wavelengths despite the fact that having fixed sensor pixel dimensions implies that there would be frequency dependent pupil pixel dimensions.

As another example of a variation which may be present in some implementations, consider a situation in which there was limited training data to use in a method such as shown in FIG. 6. In this type of scenario, the effective amount of training data may be increased by various regularization approaches, such as adding noise to defocus values during each forward pass, subsample PSFs for back propagation and weight updates (e.g., if there are 20 PSFs for target z values, use only 3 of the 20, such as the three worst PSFs, for back propagation), and/or adding Gaussian white noise to generated PSFs. An example of a modified design method which illustrates the first two of these potential regularization approaches is provided in FIG. 7.

It should be understood that, while the above examples illustrated that variations are possible within a method such as shown in FIG. 6, a method such as shown in FIG. 6 may not be adhered to in all cases, and other methods may be used when designing masks based on this disclosure. For instance, while a method such as shown in FIG. 6 may start with a pupil function and assume a diffraction model to generate PSFs, in some cases a mask may be designed in an inverse analytical fashion. For example, this may be done using a method which starts with a desired aberration-free in-focus phase mask (either through simulation or experiment), applies the inverse diffraction equation to the masks determined by the pupil function (e.g., taking the inverse Fourier transform in the case of Fraunhofer diffraction), and taking a mean (e.g., a true mean, median, or weighted average) of the resulting pupil functions to arrive at the final mask design. As another example, an inverse analytical approach may be implemented in a method in which a desired depth of field range is selected, the effects of focus aberrations on the pupil plane for every desired z-value are generated, and a circular average (e.g., mean, median or weighted average) is taken of the resulting pupil functions to arrive at the final mask design.

Figure 8:
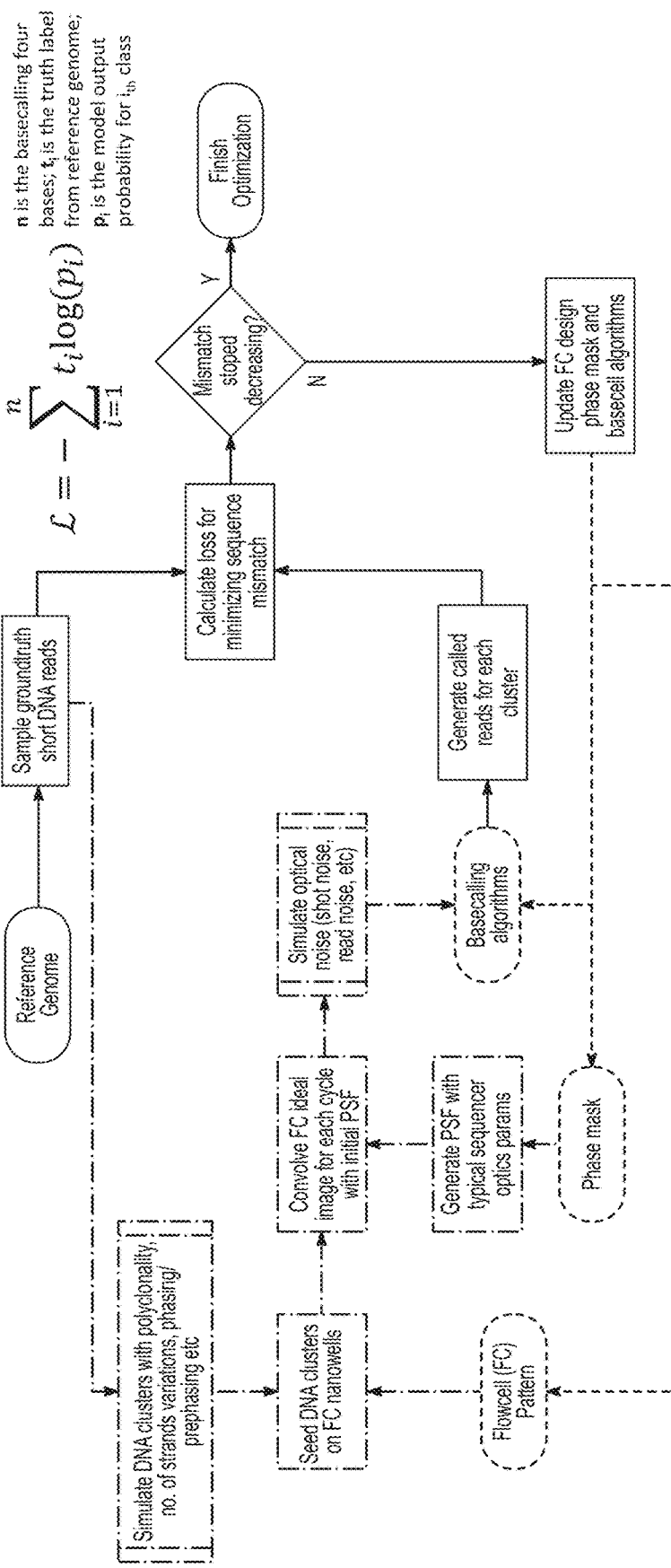
FIG. 8 illustrates an end to end design process.

Another example of an alternative design method is provided in FIG. 8, which shows an end to end design process, including an end use of signals processed using a mask (in this case, base calling). In this type of approach, base calling error rate can be used as a loss function, which not only ties mask design to an end use, but also can allow for optimization of the base calling algorithm as well. As shown, this type of approach may begin with generating DNA fragments from a reference genome. These DNA fragments may be seeded on a flowcell according to user-defined flowcell patterns (e.g., pitch, well size, etc.). Noise sources, such as polyclonality, cluster-to-cluster variation, prephasing and phasing may be incorporated, and an image of the flowcell may be added using an optics. The base caller may then be used to base call the flowcell images, and the base calls may be compared to a reference genome to calculate loss. This loss can then be back propagated to update mask parameters and, in some cases, to also update parameters of the base calling algorithm (e.g., where the base calling algorithm is implemented using a machine leaning classifier). It should be noted that, while FIG. 8 illustrates this end to end process as being performed to design a phase mask, it is not limited to phase mask design, and other types of masks (e.g., amplitude masks) may also be designed and optimized using the approach illustrated in that figure.

Variations are also possible in aspects of the disclosed technology beyond methods which may be used in designing masks. To illustrate, consider downstream processing of images, and that an image created using a mask may need to be processed by algorithms which had been optimized for images having characteristics other than those produced by using a mask. To address this possibility, in some cases a mask will be integrated along with an image to image translation algorithm (e.g., a neural network, such as described in Ronneberger et al., *U-Net: Convolutional Networks for Biomedical Image Segmentation*, arXiv: 1505:04597, the disclosure of which is incorporated by reference in its entirety) which had been trained by generating paired images with and without the mask, either in simulation or on a real instrument. As another illustration, consider that system parameters may change over time, for example, due to objective heating, photodamage, or instrument degradation. To address this, in some cases a mask may be integrated in an adaptive manner, such as integrating a phase mask using a deformable mirror or spatial light modulator, thereby allowing for recalibration in the field, and the ability to upgrade without requiring physical replacement of instrument components.

Figure 9:
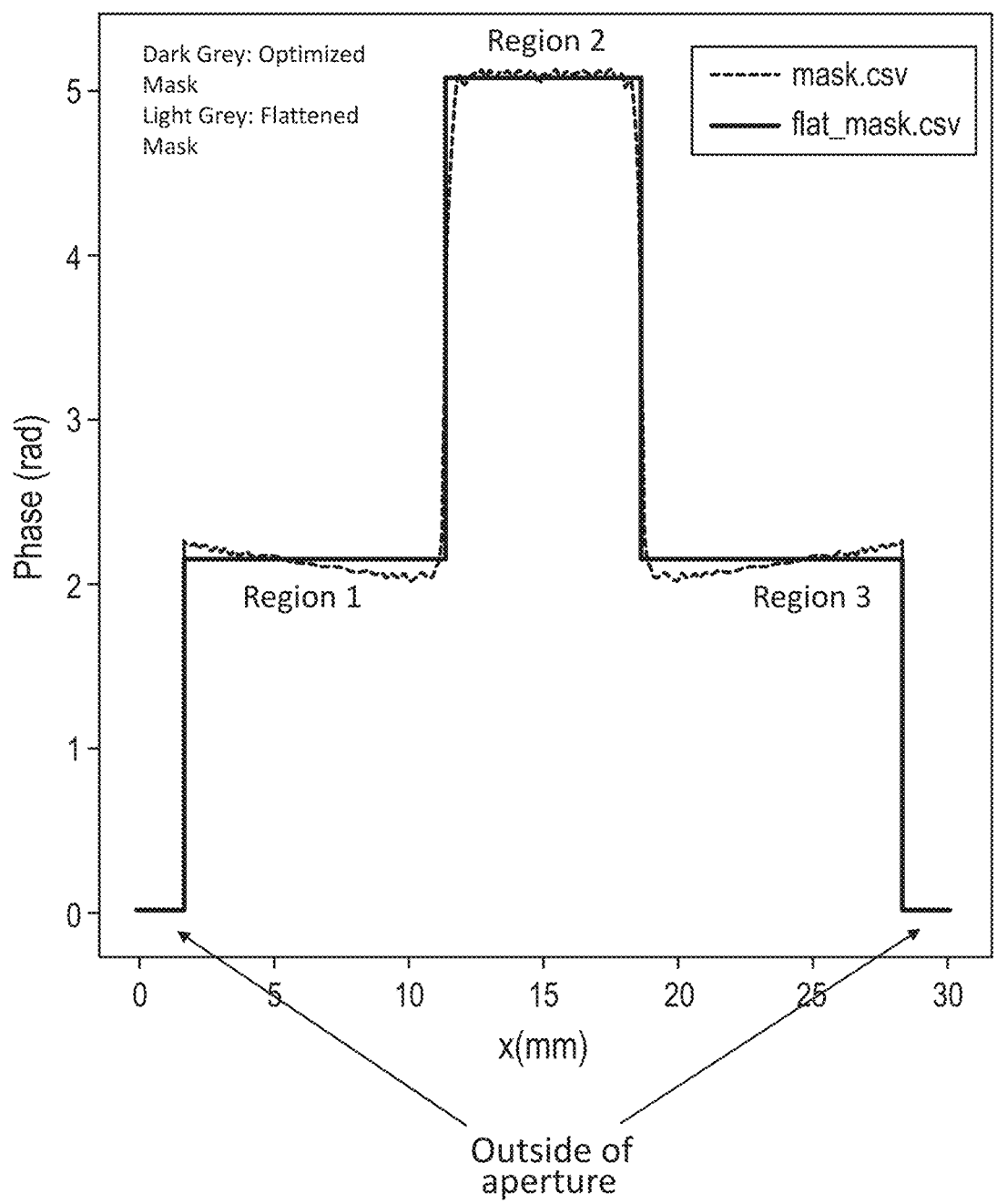
FIG. 9 illustrates cross sections of optimized and simplified phase masks.
Figure 10:
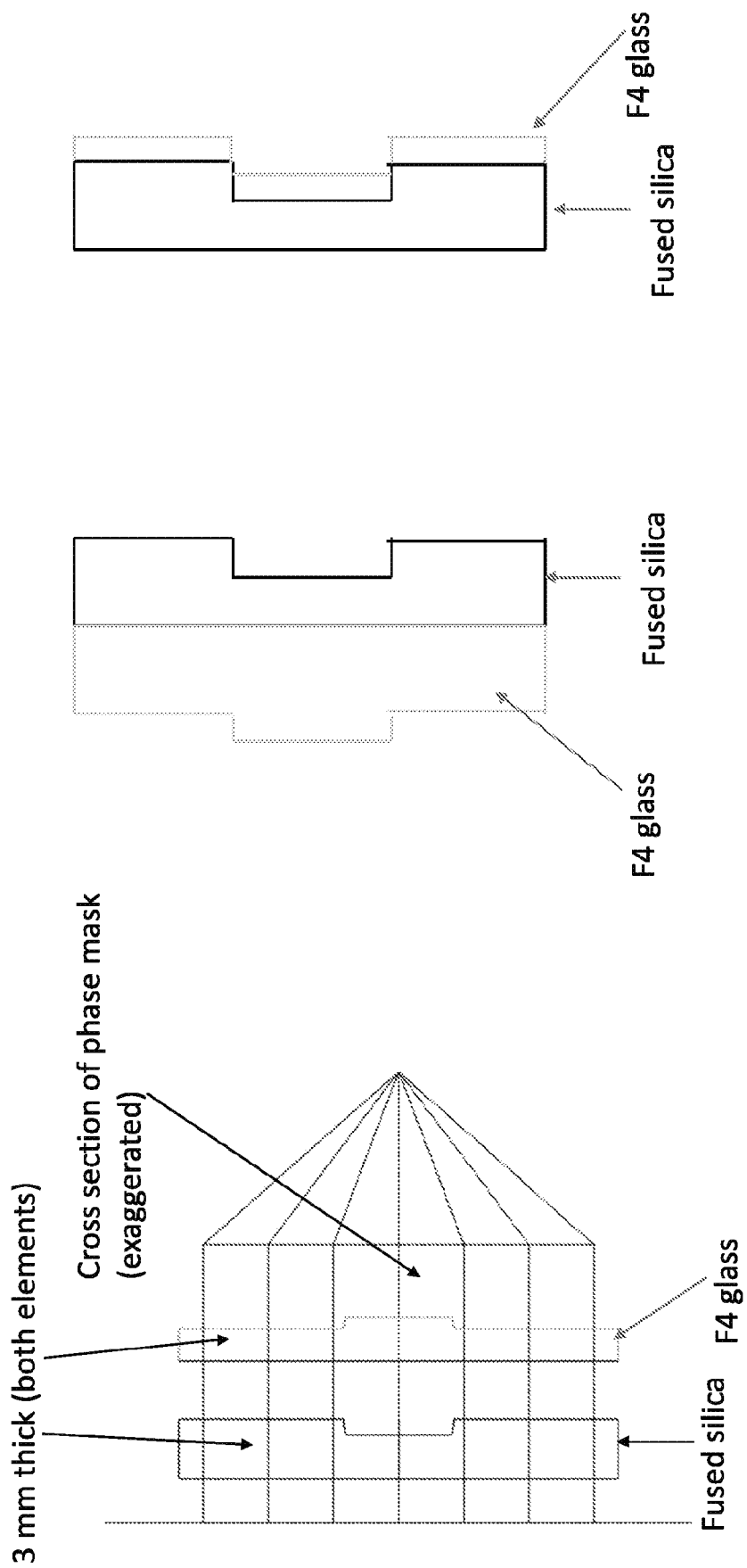
FIG. 10 illustrates how phase masks can be created using combinations of materials.

Variations are also possible in how a mask may be manufactured. For example, in some cases application of an iterative design process such as described herein may result in a mask having complex geometry which is difficult to manufacture. To address this, in some cases a mask's geometry may be simplified by dividing the mask into discrete regions. Then, in each region, a median value may be taken for that region (e.g., a median phase value in the case of a phase mask, or a median opacity value in the case of an amplitude mask), and the entire region may be given that value. An example of this is shown in FIG. 9, which shows cross sections of both an optimized phase mask, and a phase mask which has been divided into regions and flattened to improve manufacturability. Non-simplifying manufacturing variations may also be utilized in some cases. For instance, to address a scenario in which a mask (e.g., a phase mask) is applied to multiple wavelengths of light, the mask may be manufactured from multiple materials (e.g., one for each peak wavelength of light expected to be emitted from a sample) to minimize phase error caused by the multiple wavelengths. This is illustrated in FIG. 10, which shows how a phase mask can be created using a combination of fused silica and F4 glass to provide ideal phase delay for 588 nm and 440 nm light. Of course, it should be understood that the fused silica and F4 glass illustrated in FIG. 10 are intended to be illustrative only, and that other types of materials (e.g., MgF2, tiO2 glass, etc.) with reasonable differences in dispersion (e.g., a difference of about 5% or greater between materials) could be used in addition to, or as alternatives to, the fused silica and F4 glass shown in FIG. 10.

Figure 7:
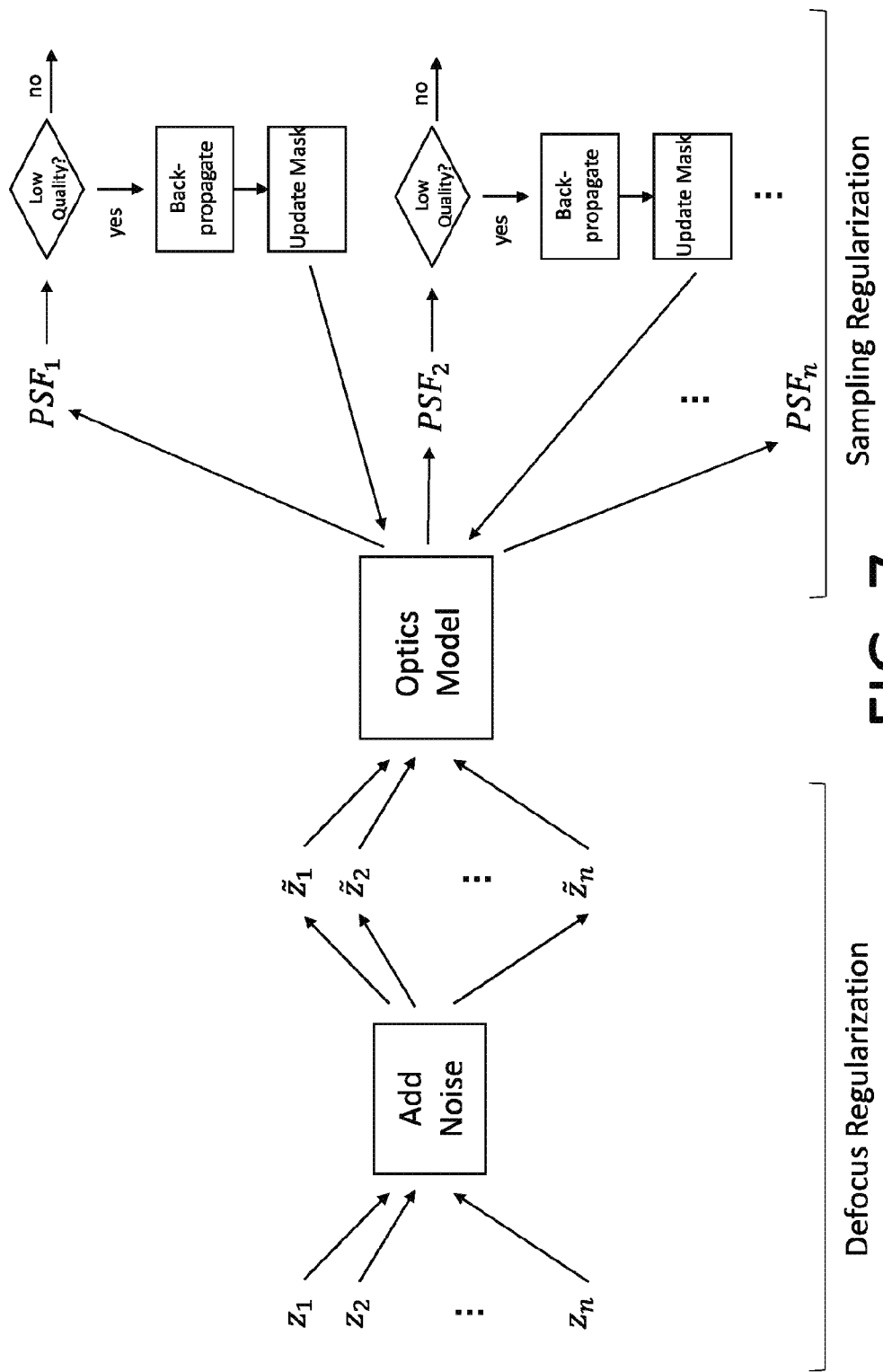
FIG. 7 illustrates a method by which an optical mask may be designed.

FIG. 11 illustrates an example computing component that may be used to implement various features of the system and methods disclosed herein, such as the aforementioned features and functionality of one or more aspects of the methods illustrated in FIGS. 6-8.

As used herein, the term module may describe a given unit of functionality that may be performed in accordance with one or more implementations of the present application. As used herein, a module may be implemented utilizing any form of hardware, software, or a combination thereof. For example, one or more processors, controllers, ASICs, PLAs, PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as may be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

Where components or modules of the disclosed technology may be implemented in whole or in part using software, in one implementation, these software elements may be implemented to operate with a computing or processing module capable of carrying out the functionality described with respect thereto. One such example computing module is shown in FIG. 11. Various implementations are described in terms of this example-computing module 1000. After reading this description, it will become apparent to a person skilled in the relevant art how to implement the application using other computing modules or architectures.

Referring now to FIG. 11, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 may also represent computing capabilities embedded within or otherwise available to a given device. For example, a computing module may be found in other electronic devices such as, for example, digital cameras, navigation systems, cellular telephones, portable computing devices, modems, routers, WAPs, terminals and other electronic devices that may include some form of processing capability.

Computing module 1000 may include, for example, one or more processors, controllers, control modules, or other processing devices such as a processor 1004. Processor 1004 may be implemented using a general-purpose or special-purpose processing engine such as, for example, a microprocessor, controller, or other control logic. In the illustrated example, processor 1004 is connected to a bus 1002, although any communication medium may be used to facilitate interaction with other components of computing module 1000 or to communicate externally.

Computing module 1000 may also include one or more memory modules, referred to herein as main memory 1008. For example, preferably random access memory (RAM) or other dynamic memory, may be used for storing information and instructions to be executed by processor 1004. Main memory 1008 may also be used for storing temporary variables or other intermediate information during execution of instructions to be executed by processor 1004. Computing module 1000 may likewise include a read only memory ("ROM") or other static storage device coupled to bus 1002 for storing static information and instructions for processor 1004.

The computing module 1000 may also include one or more various forms of information storage mechanism 1010, which may include, for example, a media drive 1012 and a storage unit interface 1020. The media drive 1012 may include a drive or other mechanism to support fixed or removable storage media 1014. For example, a hard disk drive, a solid state drive, a magnetic tape drive, an optical disk drive, a CD or DVD drive (R or RW), or other removable or fixed media drive may be provided. Accordingly, storage media 1014 may include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 may include a computer usable storage medium having stored therein computer software or data.

In alternative implementations, information storage mechanism 1010 may include other similar instrumentalities for allowing computer programs or other instructions or data to be loaded into computing module 1000. Such instrumentalities may include, for example, a fixed or removable storage unit 1022 and an interface 1020. Examples of such storage units 1022 and interfaces 1020 may include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 may also include a communications interface 1024. Communications interface 1024 may be used to allow software and data to be transferred between computing module 1000 and external devices. Examples of communications interface 1024 may include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 may typically be carded on signals, which may be electronic, electromagnetic (which includes optical) or other signals capable of being exchanged by a given communications interface 1024. These signals may be provided to communications interface 1024 via a channel 1028. This channel 1028 may carry signals and may be implemented using a wired or wireless communication medium. Some examples of a channel may include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 1000 to perform features or functions of the present application as discussed herein.

Although described above in terms of various implementations aid implementations, it should be understood that the various features, aspects and functionality described in one or more of the individual implementations are not limited in their applicability to the particular implementation with which they are described, but instead may be applied, alone or in various combinations, to one or more of the other implementations of the application, whether or not such implementations are described and whether or not such features are presented as being a part of a described implementation. Thus, the breadth and scope of protection provided by this document or any related document should not be limited by any of the above-described implementations.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The terms "substantially" and "about" used throughout this disclosure, including the claims, are used to describe and account for small fluctuations, such as due to variations in processing. For example, they may refer to less than or equal to ±0.5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide instances of the item in discussion, not an exhaustive or limiting list thereof; the terms "a" or "an" should be read as meaning "at least one," "one or more" or the like, and adjectives such as "preexisting," "traditional," "normal," "standard," "known" and terms of similar meaning should not be construed as limiting the item described to a given time period or to an item available as of a given time, but instead should be read to encompass preexisting, traditional, normal, or standard technologies that may be available or known now or at any time in the future. Likewise, where this document refers to technologies that may be apparent or known to one of ordinary skill in the art, such technologies encompass those apparent or known to the skilled artisan now or at any time in the future.

The presence of broadening words and phrases such as "one or more." "at least," "but not limited to" or other like phrases in some instances shall not be read to mean that the narrower case is intended or required in instances were such broadening phrases may be absent. The use of the term "module" does not imply that the components or functionality described or claimed as par of the module are all configured in a common package. Indeed, any or all of the various components of a module, whether control logic or other components, may be combined in a single package or separately maintained and may further be distributed in multiple groupings or packages or across multiple locations.

Additionally, the various implementations set forth herein are described in terms of block diagrams, flow charts and other illustrations. As will become apparent to one of ordinary skill in the art after reading this document, the illustrated implementations and their various alternatives may be implemented without confinement to the illustrated examples. For example, block diagrams and their accompanying description should not be construed as mandating a particular architecture or configuration.

While various implementations of the present disclosure have been described above, it should be understood that they have been presented by way of example only, and not of limitation. Likewise, the various diagrams may depict an example architectural or other configuration for the disclosure, which is done to aid in understanding the features and functionality that may be included in the disclosure. The disclosure is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present disclosure. Also, a multitude of different constituent module names other than those depicted herein may be applied to the various partitions. Additionally, with regard to flow diagrams, operational descriptions and method claims, the order in which the acts are presented herein shall not mandate that various implementations be implemented to perform the recited functionality in the same order unless the context dictates otherwise.

What is claimed is:

1. A method for extending a depth of field of a nucleic acid sequencer, the method comprising:
performing a set of optimization steps comprising:
determining a first result, wherein the first result is a result of passing light emitted by a sample at a nucleic acid site through an objective lens and a mask, wherein the objective lens is focused on a plane which is separated from the nucleic acid site by a target defocus amount, and wherein the mask is disposed between the objective lens and a set of detection pixels;
determining whether there is a discrepancy between the first result and a second result, wherein the second result is an ideal result for detecting light emitted by the sample at the nucleic acid site; and
based on determining there is the discrepancy between the first result and the second result, performing a set of updating tasks comprising updating the mask based on the determined discrepancy between the first result and the second result; and
repeating the set of optimization steps one or more times.

2. The method of claim 1, wherein:
the first result is a first point spread function (PSF) indicating how light emitted by the sample at the nucleic acid site is detected by the set of detection pixels after passing through the objective lens and the mask when the objective lens is out of focus by a target defocus amount; and
the second result is a second PSF indicating how light emitted by the sample at the nucleic acid site is detected by the set of detection pixels when the sample at the nucleic acid site is focused on a surface of the sample.

3. The method of claim 2, wherein:
the nucleic acid sequencer is configured to detect light signals emitted from multiple surfaces of a multi-surface flowcell;
updating the mask based on the determined discrepancy comprises applying a loss function, wherein the piecewise loss function comprises:
a first loss component configured to ensure that signals from a first surface of the multi-surface flowcell are in focus; and
a second loss component configured to ensure that signals from a second surface of the multi-surface flowcell are out of focus.

4. The method of claim 1, wherein:
the mask is an amplitude mask;
the sample at the nucleic acid site comprises a plurality of clusters;
the set of optimization steps comprises:
separating the plurality of clusters into a first set of clusters and a second set of clusters; and
updating the mask based on the determined discrepancy comprises determining a loss based on a mean and a standard deviation of the first set of clusters, and a mean and a standard deviation of the second set of clusters.

5. The method of claim 1, wherein:
the first result is a sequence of base calls generated by a base calling algorithm based on light emitted from the sample at the nucleic acid site and detected by the set of detection pixels after passing through objective lens and the mask; and
the second result is a sequence of base calls for a reference genome.

6. The method of claim 5, wherein:
the base calling algorithm comprises a machine learning model; and
the set of updating tasks comprises updating the machine learning model based on the discrepancy between the first result and the second result.

7. The method of claim 1, wherein:
the nucleic acid sequencer is configured to detect light signals in a plurality of wavelengths;
the first result is a result of passing a first wavelength of light emitted by the sample at the nucleic acid site through the objective lens and the mask; and
the set of optimization steps comprises:
determining a third result, wherein the third result is a result of passing a second wavelength of light emitted by the sample at the nucleic acid site through the objective lens and a second mask, wherein the objective lens is focused on the plane which is separated from the nucleic acid site by the target defocus amount, and wherein the second mask is disposed between the objective lens and a second set of detection pixels;
determining whether there is a discrepancy between the second result with and the third result; and
based on determining there is a discrepancy between the second result and the third result, performing a second set of updating tasks comprising updating the second mask based on the determined discrepancy between the second result and the third result.

8. The method of claim 1, wherein the mask is a phase mask.

9. The method of claim 1, wherein, on each repetition of the set of optimization steps:
determining the first result is performed a plurality of times, wherein each time from the plurality of times, the target defocus amount is different from the target defocus amount on each other time from the plurality of times;
performing the set of updating tasks is performed a set of times, wherein each time the set of updating tasks is performed, a loss is calculated which corresponds to the target defocus amount from a different time from the plurality of times.

10. The method of claim 9, wherein, on each repetition of the set of optimization steps, the plurality of times the first result is determined has a cardinality less than the set of times the set of updating tasks is performed.

11. The method of claim 10, wherein, on each repetition of the set of optimization tasks:
the set of updating tasks comprises determining the target defocus resulting in the largest discrepancies between the first result and the second result; and
each loss which is calculated during performance of the set of updating tasks corresponds to a target defocus amount which results in a greater discrepancy between the first result and the second result than any target defocus amount which does not correspond to a loss calculated during that repetition of the set of optimization tasks.

12. The method of claim 1, wherein set of optimization steps are performed in simulation.

* * * * *